US012308544B2

(12) United States Patent
Yamada et al.

(10) Patent No.: US 12,308,544 B2
(45) Date of Patent: May 20, 2025

(54) ELECTRICAL CONNECTOR AND ELECTRICAL CONNECTOR WITH CIRCUIT BOARD

(71) Applicant: Hirose Electric Co., Ltd., Kanagawa (JP)

(72) Inventors: Shota Yamada, Kanagawa (JP); Nobuhiro Tamai, Kanagawa (JP); Daiki Aimoto, Kanagawa (JP); Takafumi Sugawara, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 404 days.

(21) Appl. No.: 17/696,639

(22) Filed: Mar. 16, 2022

(65) Prior Publication Data

US 2022/0352658 A1 Nov. 3, 2022

(30) Foreign Application Priority Data

Apr. 28, 2021 (JP) ................................ 2021-075876

(51) Int. Cl.
*H01R 12/71* (2011.01)
*H01R 12/70* (2011.01)
*H01R 13/6471* (2011.01)

(52) U.S. Cl.
CPC ....... *H01R 12/707* (2013.01); *H01R 13/6471* (2013.01)

(58) Field of Classification Search
CPC .. H01R 12/707; H01R 13/6471; H01R 12/57; H01R 13/6587; H01R 13/648
See application file for complete search history.

(56) References Cited

U.S. PATENT DOCUMENTS

| | | | | |
|---|---|---|---|---|
| 9,478,889 | B2 * | 10/2016 | Oshida | H01R 13/6585 |
| 10,700,454 | B1 * | 6/2020 | Blackburn | H01R 11/28 |
| 2014/0357131 | A1 * | 12/2014 | Oshida | H01R 12/712 439/626 |
| 2015/0079814 | A1 * | 3/2015 | Tamai | H01R 12/91 439/55 |

(Continued)

FOREIGN PATENT DOCUMENTS

| | | | |
|---|---|---|---|
| JP | H09330770 | A | 12/1997 |
| JP | 2016-115488 | A | 6/2016 |

*Primary Examiner* — Abdullah A Riyami
*Assistant Examiner* — Nelson R. Burgos-Guntin
(74) *Attorney, Agent, or Firm* — Procopio, Cory, Hargreaves & Savitch LLP

(57) ABSTRACT

In an electrical connector wherein signal transmission paths 53 have signal connecting portions 53C soldered to signal circuit units on a circuit board, ground members 54, 55 have ground connecting portions 54C, 55C soldered to ground circuit units on the circuit board, and the ground connecting portions 54C, 55C are positioned in the arrangement direction of the signal transmission paths 53 between the signal connecting portions 53C of adjacent signal transmission paths, a width range WG between the opposite end locations of the ground connecting portions 54C, 55C of the ground members 54, 55 in the width direction, which is parallel to the mounting surface of the circuit board and perpendicular to the arrangement direction, extends beyond the width range WS of the signal connecting portions 53C of the signal transmission paths 53.

7 Claims, 7 Drawing Sheets

(56) References Cited

U.S. PATENT DOCUMENTS

| | | | | |
|---|---|---|---|---|
| 2015/0079819 | A1* | 3/2015 | Tamai | H01R 13/6582 439/101 |
| 2018/0013240 | A1* | 1/2018 | Takeuchi | H01R 13/05 |
| 2018/0062298 | A1* | 3/2018 | Mogi | H01R 27/02 |
| 2019/0020155 | A1* | 1/2019 | Trout | H01R 13/6587 |
| 2019/0280410 | A1* | 9/2019 | Tamai | H01R 12/716 |
| 2020/0083622 | A1* | 3/2020 | Tamai | H01R 12/716 |
| 2020/0083647 | A1* | 3/2020 | Tamai | H01R 13/6474 |
| 2020/0091635 | A1* | 3/2020 | Horii | H01R 13/40 |
| 2020/0127419 | A1* | 4/2020 | Cai | H01R 13/6477 |
| 2020/0176905 | A1* | 6/2020 | Buck | H01R 12/716 |
| 2020/0212631 | A1* | 7/2020 | Buck | H01R 24/28 |
| 2020/0366018 | A1* | 11/2020 | Koshiishi | G01R 1/045 |

* cited by examiner

ELECTRICAL CONNECTOR AND ELECTRICAL CONNECTOR WITH CIRCUIT BOARD

CROSS-REFERENCE TO RELATED APPLICATIONS

This application claims priority to Japanese Patent Application No. 2021-075876, filed Apr. 28, 2021, the contents of which are incorporated herein by reference in its entirety for all purposes.

BACKGROUND

Technical Field

The present invention relates to an electrical connector and to an electrical connector with a circuit board.

Background Art

An electrical connector, in which signal terminals, as well as ground terminals and ground plates serving as ground members, are retained within a housing, and which is mounted to a circuit board, is known from Patent Document 1.

In Patent Document 1, the electrical connector has a receptacle connector mounted to a circuit board and a plug connector serving as a counterpart connector mounted to another circuit board, and electrical signals are transmitted between the two circuit boards as a result of matingly connecting the plug connector to the receptacle connector. The basic configuration of the receptacle connector and the plug connector is the same in that both have signal terminals, as well as ground terminals and ground plates. At one end, the signal terminals have signal connecting portions solder mounted to a circuit board, and, at the other end, signal contact portions with which the signal terminals of a counterpart connector are contacted and connected. The ground terminals, which have the same configuration and dimensions as the signal terminals, have ground connecting portions at one end and ground contact portions at the other end, and, in addition, the ground terminals are brought in conductive communication with the ground plates.

In Patent Document 1, in which the signal terminals and ground terminals are formed with the same shape, two signal terminals form a signal terminal pair constituting a transmission path pair as a signal transmission path, and one ground terminal is positioned between adjacent signal terminal pairs collinearly with the side-by-side arrangement of the signal terminal pairs. In addition, multiple terminal rows formed by the signal terminal pairs and ground terminals are provided in a direction perpendicular to the terminal arrangement direction, and ground plates are disposed between adjacent terminal rows. The thus-configured electrical connector of Patent Document 1 transmits high-speed actuating signals via each signal terminal pair.

Patent Documents

[Patent Document 1]

Japanese Published Patent Application No. 2016-115488

SUMMARY

Problems to be Solved

It is an object of the present disclosure to provide an electrical connector and an electrical connector with a circuit board, in which crosstalk can be adequately prevented.

In the case of the electrical connector of Patent Document 1, the ground terminals are positioned between adjacent signal terminal pairs, and it can be expected that crosstalk between two signal terminal pairs will be prevented when high-speed differential signals are transmitted by the signal terminal pairs. However, in Patent Document 1, the ground terminals are of the same shape as one of the two signal terminals constituting the signal terminal pairs and only one terminal is disposed collinearly with the signal terminal pairs. Considerable crosstalk is therefore likely to be generated and concentrated around the ground terminal between adjacent signal terminal pairs, which leaves room for improvement in this respect.

It is an object of the present invention to provide an electrical connector and an electrical connector with a circuit board in which such crosstalk can be further prevented.

Technical Solution

In accordance with the present invention, the above-described problem is solved by the use of an electrical connector according to a first invention and an electrical connector with a circuit board according to a second invention.

<First Invention>

The electrical connector according to the first invention comprises multiple signal transmission paths soldered to signal circuit units on a circuit board at multiple locations spaced apart in an arrangement direction, said arrangement direction being a direction parallel to a mounting surface of the circuit board, and at least one ground member soldered to ground circuit units on the circuit board; the signal transmission paths have signal connecting portions soldered to the signal circuit units, the ground members have ground connecting portions soldered to the ground circuit units, and said ground connecting portions are positioned in the arrangement direction between the signal connecting portions of the adjacent signal transmission paths.

In such an electrical connector, in the present invention, the ground connecting portions of the ground members are characterized in that in the width direction, which is parallel to the mounting surface and perpendicular to the arrangement direction, the width range between the opposite ends of the ground connecting portions extends beyond the width range of the signal connecting portions of the signal transmission paths.

Since in the present invention the width range between the opposite ends of the ground connecting portions of the ground members extends beyond the width range of the signal connecting portions of the signal transmission paths, the width range of the ground connecting portions is formed wider than the width range of the signal connecting portions in comparison with the conventional case in which the signal terminals and ground terminals are identical in shape to one another and there is only one ground terminal connecting portion located between the signal connecting portions of adjacent signal terminals. As a result, crosstalk that concentrates around the ground connecting portions between the signal connecting portions adjacent to and sandwiching the ground connecting portions can be reduced.

In the first invention, the signal transmission paths may be single-ended terminals or terminal pairs that are adjacent and spaced apart in the arrangement direction.

In the first invention, the ground connecting portions may be part of a ground plate serving as a ground member or part of a ground terminal serving as a ground member. In addition, multiple ground connecting portions may be arranged side by side in the width direction between the signal connecting portions.

<Second Invention>

The electrical connector with a circuit board according to the second invention is characterized by the fact that it has the electrical connector according to the first invention and a circuit board that has provided thereon signal circuit units to which the signal connecting portions of the signal transmission paths in said electrical connector are soldered and ground circuit units to which the ground connecting portions of the ground members are soldered, and that the electrical connector is mounted to the circuit board.

In the second invention, multiple ground connecting portions may be arranged side by side in the width direction between the signal connecting portions, the ground circuit units of the circuit board may have multiple mounting surface portions located on the mounting surface of the circuit board in alignment with the multiple ground connecting portions, and the multiple ground connecting portions may be soldered to the mounting surface portions.

Technical Solution

Since in the present invention the width range between the opposite ends of the ground connecting portions of the ground members extends beyond the width range of the signal connecting portions of the signal transmission paths, the width range of the ground connecting portions is formed wider than the width range of the signal connecting portions, and, as a result, the crosstalk that concentrates around the ground connecting portions between adjacent signal connecting portions can be reduced.

BRIEF DESCRIPTION OF DRAWINGS

FIG. 3 is a bottom detail view of some of the blades in the relay electrical connector in

FIG. 1.

DETAILED DESCRIPTION

An embodiment of the present invention will now be described with reference to the appended drawings.

Figure 1:
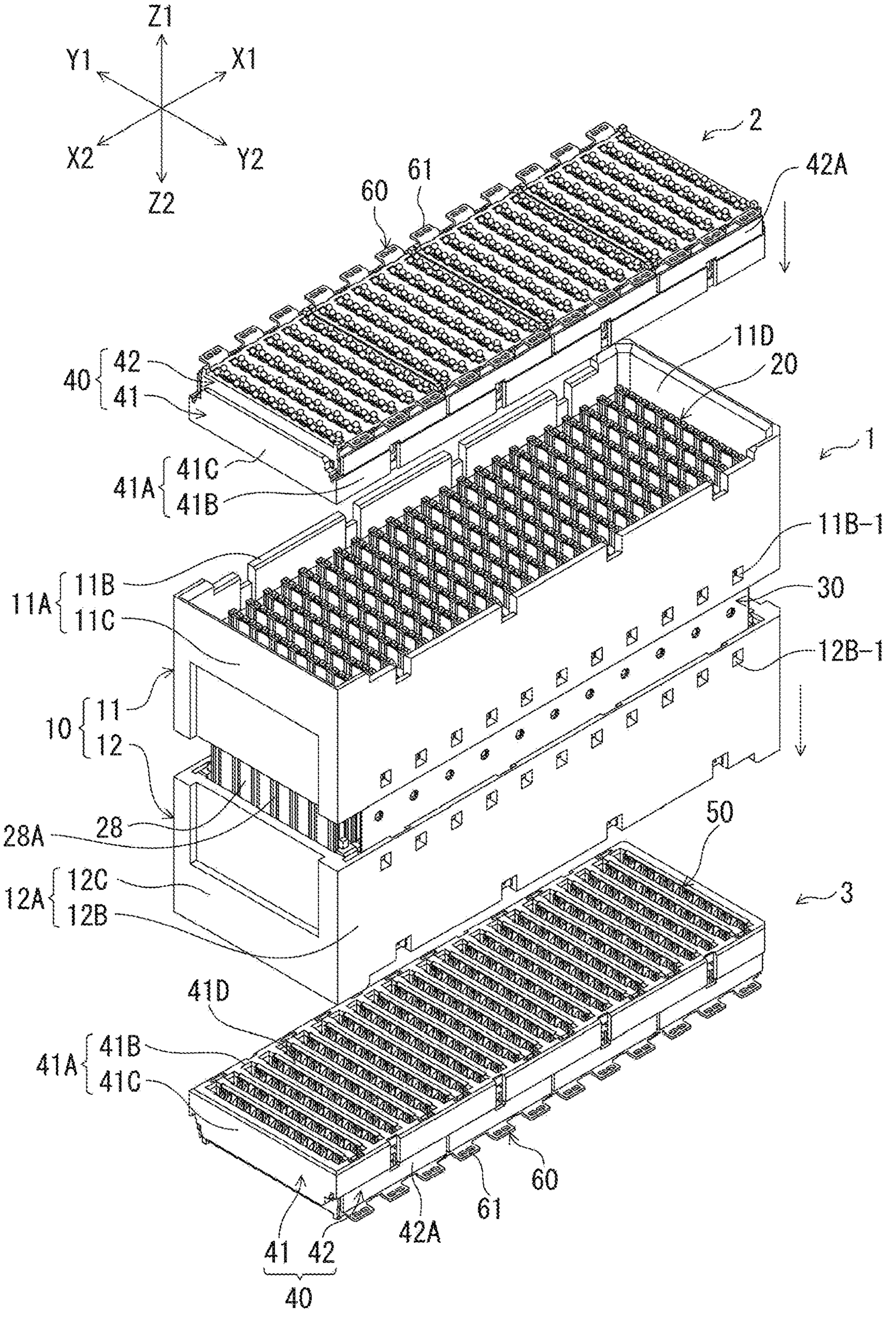
FIG. 1 is an oblique view of a relay electrical connector according to an embodiment of the present invention, along with counterpart connectors, showing the state before mating.

FIG. 1 is an oblique view of a relay electrical connector 1 serving as the first electrical connector according to an embodiment of the present invention (hereinafter referred to as the "relay connector 1"), along with counterpart electrical connectors 2, 3 serving as second electrical connectors (hereinafter referred to as the "counterpart connector 2" and the "counterpart connector 3", respectively), and shows the state before mating. In this embodiment, the relay connector 1 and the counterpart connectors 2, 3 constitute a connector assembly for transmitting a high-speed differential signal. The counterpart connectors 2, 3 are electrical connectors for a circuit board each disposed on a different circuit board (not shown), and are mated to the relay connector 1 in an orientation in which the surface of each circuit board is at a right angle to the vertical direction, or in other words, to the connector height direction (Z axis direction). More specifically, the counterpart connector 2 is mated to the relay connector 1 from above (Z1 side), and the counterpart connector 3 is matingly connected from below (Z2 side), so that the counterpart connectors 2, 3 are connected to each other via the relay connector 1. In this embodiment, the counterpart connectors 2, 3 are configured as electrical connectors having exactly the same shape.

As seen in FIG. 1, the relay connector 1 has a plurality of plate-shaped blades 20 (discussed below; see also FIG. 2(A)), a housing 10 made of an electrically insulating material such as a resin, which supports the plurality of the blades 20 arranged with specific intervals therebetween in the plate thickness direction (X axis direction), and a coupling member 30 made of two metal plates (discussed below).

The housing 10 has a substantially cuboid outer shape in which the arrangement direction (X axis direction) of the blades 20 is the lengthwise direction (hereinafter referred to as the "connector length direction"). The housing 10 has an upper housing 11 that supports the upper portion of the blades 20, and a lower housing 12 that supports the lower portion of the blades 20. As discussed below, the upper housing 11 and the lower housing 12 are coupled via the coupling members 30.

The upper housing 11 has a peripheral wall 11A that is in the form of a square frame when viewed from above and surrounds the plurality of blades 20, and a plurality of intermediate walls (not shown) for positioning the plurality of blades 20 at specific intervals in the connector length direction (X axis direction). The peripheral wall 11A has two lateral walls 11B extending in the connector length direction (X axis direction), and two end walls 11C that extend in the connector width direction (Y axis direction) perpendicular to the connector length direction and couple the ends of the two lateral walls 11B. The intermediate walls are in the form of plates whose plane is perpendicular to the connector length direction in a space surrounded by the peripheral wall 11A, and link the inner wall surfaces of the two lateral walls 11B to each other, and are arranged at specific intervals in the connector length direction.

A slit-shaped space that passes through in the vertical direction between adjacent intermediate walls or between the intermediate walls and the end walls 11C constitutes a blade-accommodating space for accommodating the upper portion of the blades 20 (not shown). Also, a plurality of upper latching hole portions 11B-1, which pass through the lateral walls 11B in the wall thickness direction (Y axis direction), are formed at specific intervals in the connector length direction (X axis direction) at the lower portions of the lateral walls 11B. The upper latching hole portions 11B-1 can be latched with the upper latching pieces (discussed below) of the coupling members 30.

The peripheral wall 11A extends upward beyond the upper ends of the intermediate walls. The space surrounded by this upwardly extending portion, that is, the space that opens upward and communicates with the blade-accommodating space, is formed as an upper receiving portion 11D for receiving the counterpart connector 2 from above. When the blades 20 have been put in the blade-accommodating space, as seen in FIG. 1, the upper end side portions of the blades 20 protrude from the upper end opening of the blade-accommodating space and are located within the upper receiving portion 11D.

The lower housing 12 has the same shape as the upper housing 11 described above, is provided in an orientation that is in vertical symmetry with respect to the upper housing 11, and accommodates the lower portions of the blades 20 in a slit-shaped blade-accommodating space (not shown). In the lower housing 12, the portions corresponding to the various portions of the upper housing 11 are designated by adding "1" to the numbering of the upper housing 11, and the names of the portions of the lower housing 12 are the same as those of the upper housing 11, except that "lower" replaces "upper" in each portion name. Therefore, the lower housing 12 will not be described below.

The coupling members 30 are made by punching out and partially bending a piece of sheet metal. The lengthwise direction in which the coupling members 30 extend is the connector length direction (X axis direction), and one of these members is provided on each of the two sides of the blades 20 in the connector width direction, in an orientation in which the plate thickness direction coincides with the connector width direction (Y axis direction). On the upper end side of the coupling members 30, upper latching pieces (not shown) that go into the upper latching hole portions 11B-1 and latch in the vertical direction (Z axis direction) are formed by cutting and lifting portions of the coupling members 30, at positions corresponding to the upper latching hole portions 11B-1 of the upper housing 11 in the connector length direction. On the lower end side of the coupling members 30, just as with the upper latching pieces (not shown), lower latching pieces (not shown) that latch the lower latching hole portions 12B-1 of the lower housing 12 in the vertical direction (Z axis direction) are provided.

Figure 2A:
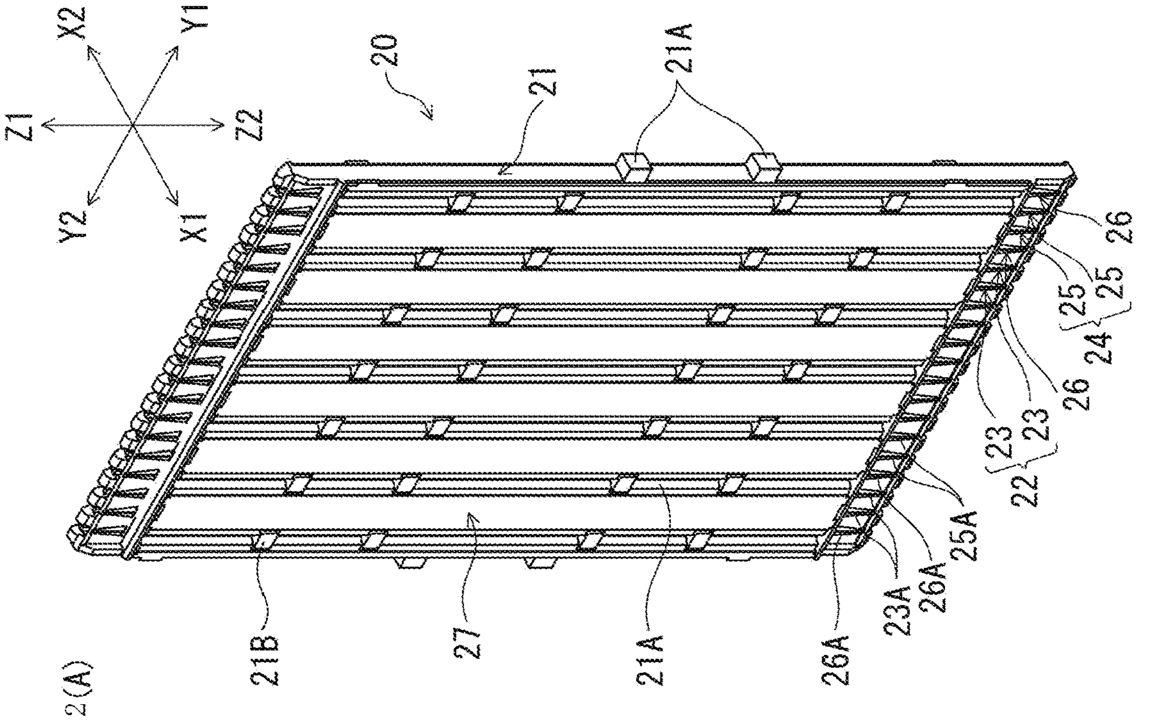
FIG. 2(A) is an oblique view of the blades of the relay electrical connector in FIG. 1 as a single unit.
Figure 2B:
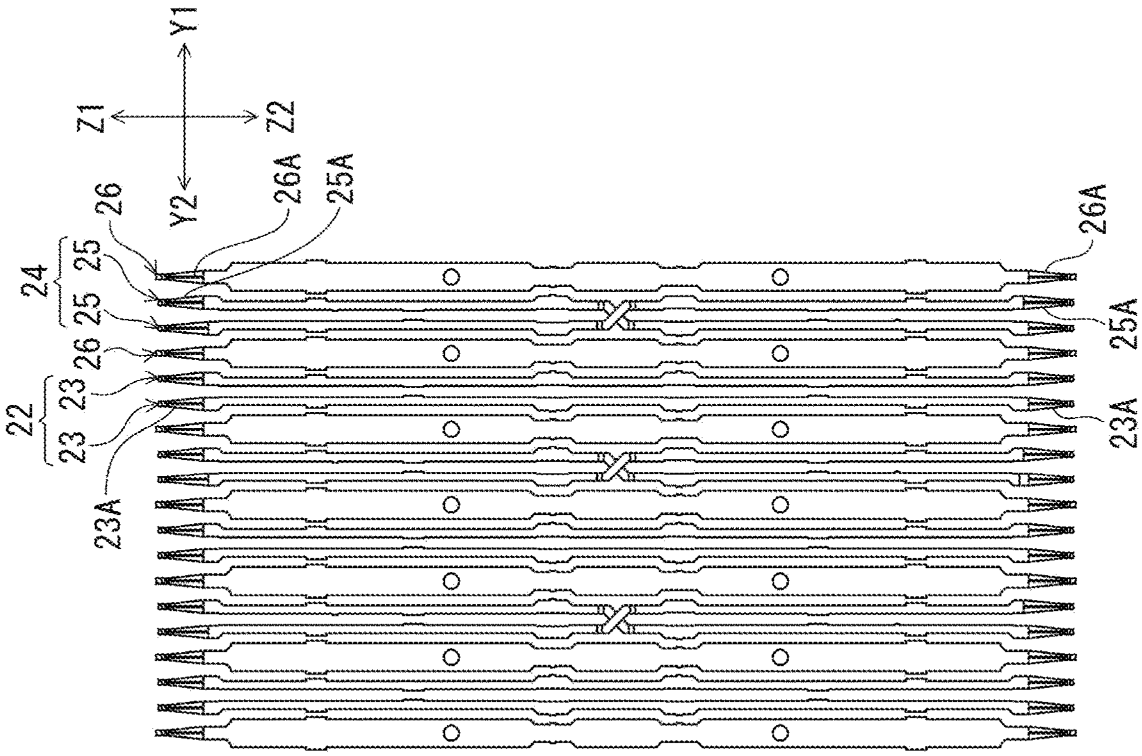
FIG. 2(B) is a front view showing only the signal terminal pairs and ground terminals of the blades of FIG. 2(A).

FIG. 2(A) is an oblique view of the blades 20 as a single unit, and FIG. 2(B) is a front view that shows only the signal terminal pairs 22, 24 and the ground terminals 26 (discussed below) provided to the blades 20 in FIG. 2(A). As shown in FIG. 2(A), the blades 20 have a plate-shaped base material 21 made of resin; signal terminal pairs 22, 24 that form first transmission path pairs serving as a plurality of first signal transmission paths arranged and held on the base material 21; a plurality of ground terminals 26 arranged and held on the base material 21 in the same row as the signal terminal pairs 22, 24; and a first ground plate 27 and a second ground plate 28 (hereinafter collectively referred to as the "ground plates 27, 28" when it is not necessary to distinguish between the two) that are made of metal and are attached to the plate surfaces (the surfaces extending in the YZ direction) on both sides of the base material 21. FIG. 2(A) shows the first ground plate 27 attached to the plate surface on the X1 side of the base material 21. FIG. 1 shows the second ground plate 28 attached to the plate surface on the X2 side of the base material 21.

Two supported protrusions 21A are formed on the base material 21 so as to project at positions near the center of both end edges extending in the vertical direction. The supported protrusions 21A are supported in the vertical direction by stepped portions (not shown) formed on the inner wall surfaces of the lateral walls 11B of the upper housing 11 and the lateral walls 12B of the lower housing 12. Holding protrusions 21B for holding the ground plates 27, 28 are formed on the base material 21 at the same positions as the ground terminals 26 in the connector width direction (Y axis direction), so as to project from the plate surfaces on both sides of the base material 21 at a plurality of positions in the vertical direction. FIG. 2(A) shows the holding protrusions 21B for holding the first ground plate 27.

As seen in FIG. 2(B), the signal terminal pairs 22, 24 and the ground terminals 26 are made by punching out a metal plate in the plate thickness direction and partially bending the metal plate, and the overall shape is that of a slender strip extending in the vertical direction (Z axis direction). The signal terminal pairs 22, 24 have two types of pairs, straight pairs 22 and cross pairs 24. In this embodiment, as seen in FIG. 2(B), the straight pairs 22 and the cross pairs 24 are alternately disposed in the connector width direction (Y axis direction), and furthermore, the ground terminals 26 are disposed at positions between the straight pairs 22 and the cross pairs 24, and at positions on the outside of both of the arrangement range of the straight pairs 22 and the cross pairs 24. That is, as shown in FIG. 2(B), starting from the Y1 side, there are disposed a ground terminal 26, a cross pair 24, a ground terminal 26, and a straight pair 22 in a repeating pattern, and the ground terminals 26 are located at both end sides of the terminal row.

The straight pairs 22 have a pair of straight terminals 23 extending spaced apart from each other over the entire range from one end side to the other end side in the vertical direction. As shown in FIG. 2(B), a pair of straight terminals 23 has a shape that is in left-right symmetry as well as in vertical symmetry with each other when viewed in the plate thickness direction (X axis direction) of the straight terminals 23. The straight terminals 23 have signal connecting portions 23A for connecting to counterpart straight terminals 53 (discussed below) of the counterpart connectors 2, 3, at both ends in the vertical direction.

The cross pairs 24 have a pair of cross terminals 25. When viewed in the plate thickness direction (X axis direction) of the cross terminals 25, the pair of cross terminals 25 have intermediate portions, which are located between one end side and the other end side in the vertical direction, that are bent and overlap so as to approach each other in the connector width direction (Y axis direction). At the overlapping positions, the pair of cross terminals 25 are bent in the plate thickness direction so as to be separated from each other in the plate thickness direction (X axis direction), and intersect without coming into contact with each other. As seen in FIG. 2(B), the pair of cross terminals 25 have a shape that is in left-right symmetry as well as in vertical symmetry with each other when viewed in the plate thickness direction (X axis direction) of the cross terminals 25. The cross terminals 25 have signal connecting portions 25A at both ends in the vertical direction for connecting with the counterpart straight terminals 53 (discussed below) of the counterpart connectors 2, 3.

As seen in FIG. 2(B), the ground terminals 26 are formed wider in the connector width direction (Y axis direction) than the straight terminals 23 and the cross terminals 25. The ground terminals 26 have ground connecting portions 26A for connecting to first counterpart ground plates 54 (discussed below) of the counterpart connectors 2, 3, at both ends in the vertical direction.

The straight pairs 22, the cross pairs 24, and the ground terminals 26 are held on the base material 21 by integral molding such that they are arranged in the order shown in FIG. 2(B). When the straight pairs 22, the cross pairs 24, and the ground terminals 26 are held on the base material 21, the signal connecting portions 23A, 25A and the ground connecting portions 26A are exposed from the plate surface on the X1 side of the base material 21 as shown in FIG. 2(A), and can make contact with the counterpart straight terminals 53 of the counterpart connectors 2, 3 or the first counterpart ground plate 54 at this exposed surface.

The ground plates 27, 28 are attached to the base material 21 by, for example, ultrasonic fusion so as to cover substantially the entire plate surface of the base material 21. In this embodiment, the first ground plate 27 is formed slightly shorter than the base material 21 in the vertical direction, and as a result, as seen in FIG. 2(A), the upper and lower signal connecting portions 23A, 25A and the ground connecting portions 26A are exposed from the plate surface on the X1 side of the base material 21. Meanwhile, the second ground plate 28 has substantially the same length as the base material 21 in the vertical direction, or in other words is formed longer than the first ground plate 27, and the upper and lower ends of the second ground plate 28 are located at substantially the same positions as the upper and lower ends of the base material 21. Ridges 27A, 28A, which project toward the ground terminals 26 in the thickness direction (X axis direction) of the blades 20 and extend in the vertical direction (Z axis direction), are formed by bending at the ground plates 27, 28 at the same positions as the ground terminals 26 in the connector width direction (Y axis direction), and can make contact and be electrically connected to the plate surface of the ground terminals 26 at the protruding tops of the ridges 27A, 28A. FIG. 2(A) shows the ridge portions 27A of the first ground plate 27, and FIG. 1 shows the ridge portions 28A of the second ground plate 28.

Figure 3:
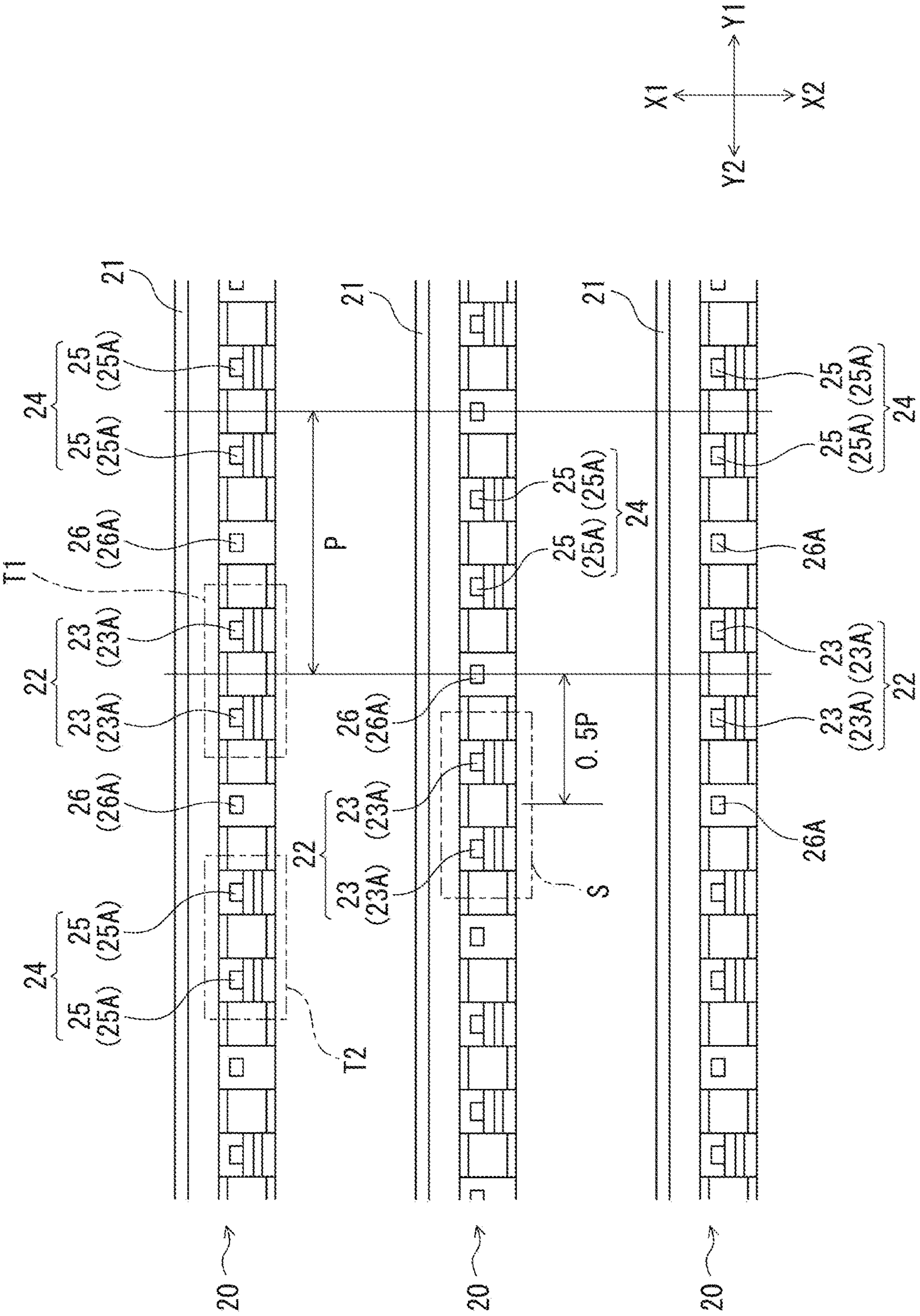

The plurality of blades 20 arranged in the connector length direction (X axis direction) in the relay connector 1 are positioned so that adjacent blades 20 are offset from each other in the connector width direction (Y axis direction). FIG. 3 shows a detail view of the intermediate portion of three of the blades 20 in the connector width direction (Y axis direction). In this embodiment, as seen in FIG. 3, in each blade 20, adjacent signal terminal pairs 22, 24 are disposed at a distance of pitch P away from each other. Here, the pitch P is the distance between the center position of the straight terminals 23 in the straight pairs 22 and the center position of the cross terminals 25 in the adjacent cross pairs 24.

Also, as seen in FIG. 3, the ground terminals 26 are disposed at positions such that the distance between the center position of a ground terminal 26 and the center position of the signal terminal pairs 22, 24 adjacent to said ground terminal 26 is 0.5P (half pitch), which is one half of the pitch P. In other words, the straight terminals 23, the cross terminals 25, and the ground terminals 26 are arranged at a spacing of 0.5P (half pitch), that is, at equal intervals. In this embodiment, the arrangement of the signal terminal pairs 22, 24 in each blade 20 is referred to as a "signal transmission path row".

In this embodiment, the straight pairs 22 and the cross pairs 24 are alternately disposed in each signal transmission path row, thereby reducing far-end crosstalk (FEXT).

As can be seen in FIG. 3, in this embodiment, for any two signal transmission path rows that are adjacent to each other in the connector length direction (X axis direction), the signal terminal pairs 22, 24 of one signal transmission path row are disposed in the center position between the signal terminal pairs 22, 24 of the other signal transmission path row in the connector width direction (Y axis direction). That is, the signal terminal pairs 22, 24 of the one signal transmission path row are offset by 0.5 P (half pitch) with respect to the signal terminal pairs 22, 24 of the other signal transmission path row.

For example, in the three signal transmission path rows (upper, middle, and lower) shown in FIG. 3, if we let the "one signal transmission path row" be the middle signal transmission path row, and let "the other signal transmission path row" be the upper signal transmission path row, then the signal terminal pairs 22, 24 of the middle signal transmission path row are offset by 0.5 P (half pitch) toward the Y2 side in the connector width direction with respect to the signal terminal pairs 22, 24 in the upper signal transmission path row.

For example, if we focus on the straight pair 22 that is one signal terminal pair that is arbitrarily specified in the middle signal transmission path row shown in FIG. 3 (referred to here as the "specific pair S"), there are two signal terminal pairs 22, 24 that are near the specific pair S in the upper signal transmission path row. Here, these two signal terminal pairs 22, 24 shall be referred to as the "first nearby pair T1" and the "second nearby pair T2", respectively. In FIG. 3, the specific pair S, the first nearby pair T1, and the second nearby pair T2 are each surrounded by one-dot chain line.

As seen in FIG. 3, the first nearby pair T1 and the second nearby pair T2 are located adjacent to each other in the same signal transmission path row (the upper signal transmission path row), the first nearby pair T1 is offset by 0.5 P (half pitch) toward the Y1 side in the connector width direction (Y axis direction) with respect to the specific pair S, and the second nearby pair T2 is offset by 0.5 P (half pitch) toward the Y2 side in the connector width direction with respect to the specific pair S. That is, the specific pair S is located in the center between the first nearby pair T1 and the second nearby pair T2 in the connector width direction. Therefore, the distance between the specific pair S and the first nearby pair T1 is equal to the distance between the specific pair S and the second nearby pair T2.

The first nearby pair T1 is a straight pair 22, and the second nearby pair T2 is a cross pair 24. That is, the first nearby pair T1 is a pair of the same type as the specific pair S, and the second nearby pair T2 is a pair that is different from the specific pair S. When a signal is transmitted by the signal terminal pairs 22, 24, the polarities are reversed between signal terminal pairs 22, 24 of different types, and the polarities are not reversed between signal terminal pairs 22, 22 of the same type. That is, in this embodiment, when the signal transmission directions between the specific pair S and the first nearby pair T1 and between the specific pair S and the second nearby pair T2 are opposite to each other, the peaks of the waveforms of near-end crosstalk (NEXT) signals from the first nearby pair T1 and those of NEXT signals from the second nearby pair T2 will reach the specific pair S in a state of being offset. Therefore, this avoids the overlapping of the peaks of the waveforms of the NEXT signals from the first nearby pair T1 and the second nearby pair T2, and near-end crosstalk (NEXT) in the specific pair S is accordingly reduced.

Also, in this embodiment, the specific pair S is located in the center between the first nearby pair T1 and the second nearby pair T2 in the connector width direction, and since the distance between the specific pair S and the first nearby pair T1 is equal to the distance between the specific pair S and the second nearby pair T2, the peaks of the waveforms of the NEXT signals from the first nearby pair T1 and the second nearby pair T2 can be maximally offset with respect to the specific pair S, and NEXT can be better reduced in the specific pair S.

Next, the configuration of the counterpart connectors 2, 3 will be described. As can be seen in FIG. 1, the counterpart connectors 2, 3 have exactly the same configuration, so the description will center on the configuration of the counterpart connector 3 here, and since the components of the counterpart connector 2 are numbered the same as those of the counterpart connector 3, they will not be described. As seen in FIG. 1, the counterpart connector 3 has a housing 40 formed in a cuboid shape that matches the lower receiving portion (not shown) of the lower housing 12 of the relay connector 1, a plurality of terminal holders 50 that are arranged and held in the housing 40, and a fixing member 60 made of two metal plates (discussed below).

The housing 40 is made of an electrically insulating material such as resin, and has a substantially cuboid shape in which the arrangement direction of the terminal holders 50 (X axis direction) is the lengthwise direction (connector length direction). The housing 40 is divided in the vertical direction to form an upper housing 41 and a lower housing 42. The upper housing 41 and the lower housing 42 are linked via the fixing member 60. The housing 40 accommodates and holds a plurality of terminal holders 50 arranged in the connector length direction.

The upper housing 41 has a peripheral wall 41A having a square frame shape when viewed in the vertical direction, and a plurality of intermediate walls 41D extending in the connector width direction (Y axis direction) in the space surrounded by the peripheral wall 41A. The peripheral wall 41A has two lateral walls 41B extending in the connector length direction (X axis direction), and two end walls 41C that extend in the connector width direction, which is the short-side direction perpendicular to the connector length direction, and link the ends of the two lateral walls 41B. The plurality of intermediate walls 41D extend in the connector width direction and link the inner wall surfaces of the two lateral walls 41B. Groove-shaped upper linking groove portions (not shown) that pass through in the vertical direction are formed at a plurality of positions in the lateral walls 41B at specific intervals in the connector length direction.

The lower housing 42 holds a plurality of terminal holders 50 arranged at equal intervals in the connector length direction (X axis direction). The two lateral walls 42A of the lower housing 42 have groove-shaped lower linking groove portions (not shown) that pass through in the vertical direction and communicate with the upper linking groove portions, and that are formed at the same positions in the connector length direction as the upper linking groove portions of the upper housing 41.

The fixing member 60 is made by punching out a metal plate member extending in the connector length direction (X axis direction) and bending it in the plate thickness direction. The fixing member 60 extends over the entire arrangement range of the terminal holders 50 in the connector length direction, and is disposed at both end positions of the counterpart connector 3 in the connector width direction (Y axis direction). The fixing member 60 has a press-fitting portion (not shown) on a lateral plate portion (not shown) having a plate surface perpendicular to the connector width direction, at the same positions as the upper linking groove portions of the upper housing 41 and the lower linking groove portions of the lower housing 42. The press-fitting portion is held in the housing 40 by being press-mated into both the upper linking groove portions and the lower linking groove portions from below. Also, a fixing portion 61 that is bent in the plate thickness direction and extends outward in the connector width direction is formed at the lower portion of the fixing member 60, and can be fixed to the corresponding portion of the mounting surface of the circuit board by soldering.

Figure 4A:
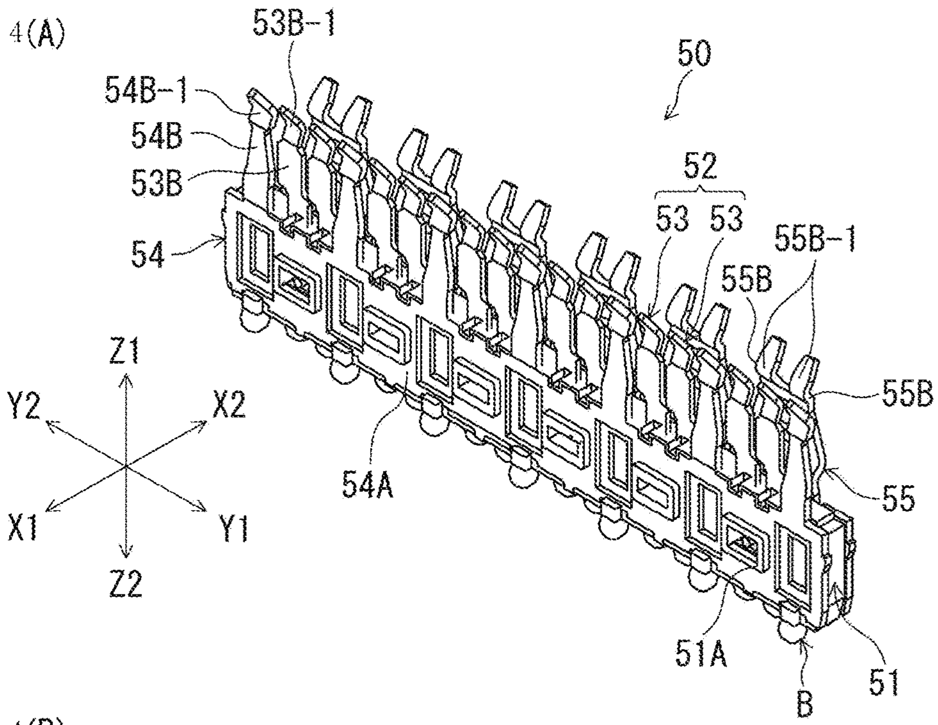
FIG. 4(A) is an oblique view showing terminal holders of the counterpart connector of FIG. 1 as a single unit.
Figure 4B:
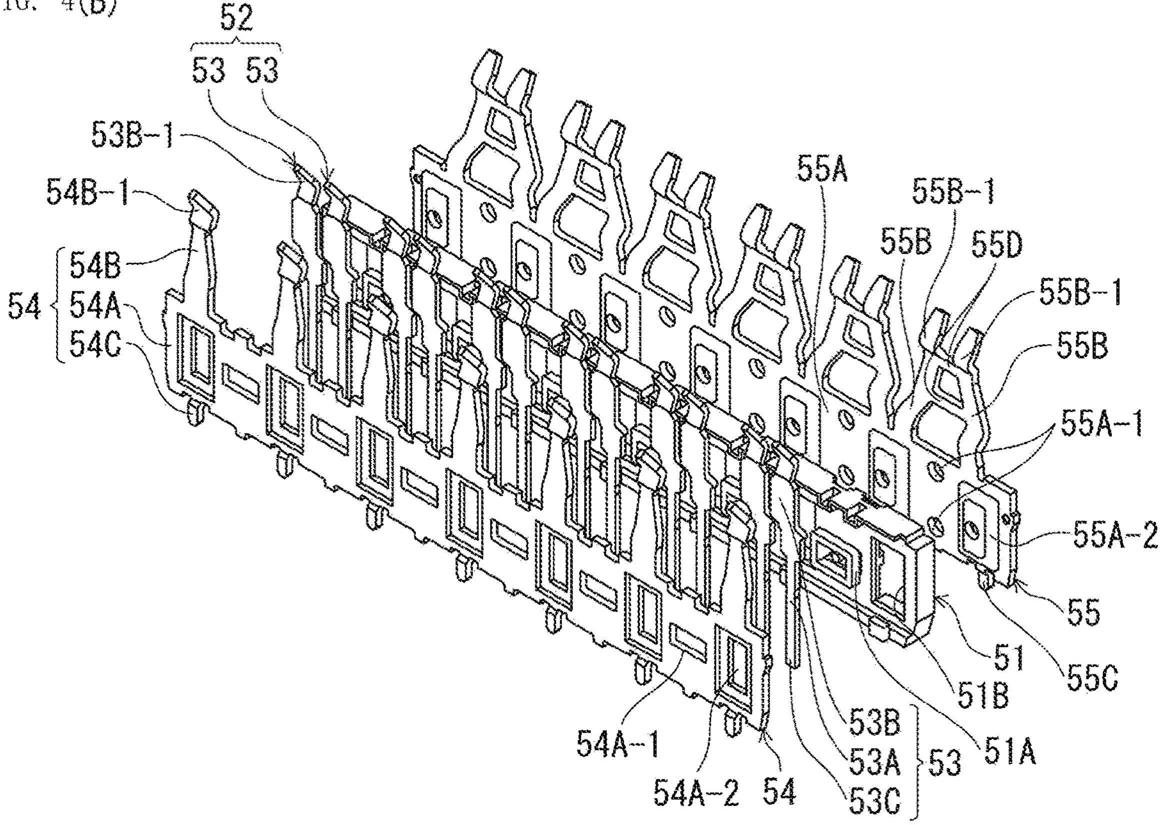
FIG. 4(B) is an oblique view of when the components of the terminal holder in FIG. 4(A) have been separated.

FIG. 4(A) is an oblique view showing a terminal holder 50 of the counterpart connector 3 as a single unit, and FIG. 4(B) is an oblique view showing the components of the terminal holder 50 of FIG. 4(A) after having been separated. As seen in FIGS. 4(A) and (B), the terminal holder 50 has a holding member 51 made of an electrically insulating material such as resin; signal terminal pairs 52 that form second transmission path pairs serving as second signal transmission paths made of metal that are arranged in the connector width direction (Y axis direction) and are held by the holding member 51; and a first counterpart ground plate 54 and a second counterpart ground plate 55 made of metal plates and serving as ground members that are attached to the plate surfaces on both sides of the holding member 51 (surfaces extending in the YZ direction) (hereinafter, these will be collectively referred to as the "counterpart ground plates 54, 55" when it is not necessary to distinguish between the two).

The holding member 51 is in the form of a plate extending over the terminal arrangement range in the connector width direction (Y axis direction). Holding protrusions and holding hole portions 51B for holding the counterpart ground plates 54, 55 are formed on the holding member 51. The holding protrusions are formed so as to project from the plate surfaces on both sides of the holding member 51 at the same positions as held hole portions 54A-1, 55A-1 (discussed below) of the counterpart ground plates 54, 55 in the connector width direction. FIG. 4(B) shows a holding protrusion 51A for holding the first counterpart ground plate 54. The holding hole portions 51B are formed so as to pass through the holding member 51 in the X axis direction at the same positions as the held protrusion portions 54A-2 and 55A-2 (discussed below) of the counterpart ground plates 54, 55 in the connector width direction.

The plurality of signal terminal pairs 52 are second signal terminal pairs corresponding to the signal terminal pairs 22, 24, which are first signal terminal pairs provided in the relay connector 1 serving as a first electrical connector, and are disposed at specific intervals in the connector width direction (Y axis direction). As seen in FIG. 4(B), the signal terminal pairs 52 each have a pair of counterpart straight terminals 53 forming a straight pair extending spaced apart over the entire range from one end side to the other end side in the vertical direction. The counterpart straight terminals 53 have a straight held portion 53A that is held by the holding member 51 by integral molding, a signal elastic arm portion 53B extending upward from the held portion 53A, and a signal connecting portion 53C extending downward from the held portion 53A.

As seen in FIG. 4(B), the signal elastic arm portions 53B are formed with a terminal width dimension (the dimension in the Y axis direction) that is greater than that of the held portions 53A, and can undergo elastic displacement in the plate thickness direction (X axis direction). Signal contact portions 53B-1 for making contact with the signal connecting portions 23A of the signal terminal pairs 22, 24 provided to the relay connector 1 are formed at the upper end portions of the signal elastic arm portions 53B by curving so as to project toward the X2 side. As seen in FIG. 4(B), the signal connecting portions 53C are formed in a straight shape and with the same terminal width as the held portions 53A. The signal connecting portions 53C are soldered to the signal circuit unit of the circuit board.

The first counterpart ground plate 54 is attached to the plate surface on the X1 side of the holding member 51, and has a first base portion 54A extending along this plate surface, first ground elastic arm portions 54B extending upward from the first base portion 54A at a plurality of positions in the connector width direction (Y axis direction), and first ground connecting portions 54C extending downward from the first base portion 54A at a plurality of positions in the connector width direction.

As seen in FIG. 4(B), the held hole portions 54A-1 and the held protrusion portions 54A-2 are alternately formed in the first base portion 54A at specific intervals in the connector width direction. The held hole portions 54A-1 are hole portions that pass therethrough in a rectangular shape, and are formed at positions corresponding to the first ground elastic arm portions 54B that are adjacent in the connector width direction. The held protrusion portions 54A-2 protrude in a rectangular shape toward the X2 side at both side positions of the held hole portions 54A-1. The held hole portions 54A-1 and the held protrusion portions 54A-2 are held by being integrally molded in a state of being engaged with the holding protrusion portions 51A and the holding hole portions 51B of the holding member 51, respectively.

As seen in FIGS. 4(A) and (B), the first ground elastic arm portions 54B extend upward from the upper edge of the first base portion 54A, and are formed in the same length as the signal elastic arm portions 53B of the counterpart straight terminals 53. Two first ground elastic arm portions 54B adjacent to each other and forming a pair are located on both sides of a pair of signal elastic arm portions 53B in the connector width direction. The first ground elastic arm portions 54B can be elastically displaced in the plate thickness direction (X axis direction). Two first ground contact portions 54B-1 for making contact with the ground terminals 26 of the blades 20 of the relay connector 1 are formed at the upper end portions of the first ground elastic arm portions 54B by curving so as to project toward the X2 side. As seen in FIG. 4(A), the first ground contact portions 54B-1 are located in the same row as the signal contact portions 53B-1 of the pair of counterpart straight terminals 53 in the connector width direction.

As seen in FIG. 4(B), the first ground connecting portions 54C extend downward from the lower edge of the first base portion 54A at the same positions as the first ground elastic arm portions 54B in the connector width direction. The first ground connecting portions 54C are located on both sides of two signal connecting portions 52C of the signal terminal pairs 52 in the connector width direction (see also FIG. 5). The first ground connecting portions 54C are soldered to the ground circuit unit of the circuit board.

The second counterpart ground plate 55 is attached to the plate surface on the X2 side of the holding member 51 and has a second base portion 55A extending along this plate surface, two second ground elastic arm portions 55B extending upward from the second base portion 55A at a plurality of positions in the connector width direction (Y axis direction), and second ground connecting portions 55C extending downward from the second base portion 55A at a plurality of positions in the connector width direction.

As seen in FIG. 4(B), the held hole portions 55A-1 and the held protrusion portions 55A-2 are alternately formed in the second base portion 55A at specific intervals in the connector width direction. The held hole portions 55A-1 are hole portions that pass therethrough in a circular shape and are arranged at two positions in the vertical direction, at a position corresponding to the central position of the second ground elastic arm portions 55B in the connector width direction. The held protrusion portions 55A-2 project in a rectangular shape toward the X1 side at both side positions of the held hole portions 55A-1. The held hole portions 55A-1 and the held protrusion portions 55A-2 are held by being integrally molded in a state of being engaged with the holding protrusions (not shown) and the holding hole portions 51B of the holding member 51, respectively. Also, in this embodiment, in a state in which the counterpart ground plates 54, 55 are held by the holding member 51, the held protrusion portions 54A-2 of the first counterpart ground plate 54 and the held protrusion portions 55A-2 of the second counterpart ground plate 55 are in direct contact, and are electrically conductive.

As seen in FIG. 4(B), the second ground elastic arm portions 55B extend upward from the upper edge of the second base portion 55A. Two second ground elastic arm portions 55B that are adjacent and form a pair are located such that the distance between the upper end portions is less than that of the lower end portions, and are coupled by a coupling portion 55D extending in the connector width direction at two positions in the vertical direction. The second ground elastic arm portions 55B can be elastically displaced in the plate thickness direction (X axis direction). Two second ground contact portions 55B-1 for making contact with the second ground plate 28 of the blades 20 of the relay connector 1 are formed at the upper end portions of the second ground elastic arm portions 55B by curving so as to project toward the X1 side. These two second ground contact portions 55B-1 are located at the same position as the signal contact portions 53B-1 of a pair of signal elastic arm portions 53B in the connector width direction and the vertical direction, and are opposite two signal contact portions 53B-1 as seen in FIG. 4(A).

As seen in FIG. 4(B), the second ground connecting portions 55C extend downward from the lower edge of the second base portion 55A at positions corresponding to both sides of the pair of the second ground elastic arm portions 55B in the connector width direction. The second ground connecting portions 55C are located on both sides of two signal connecting portions 53C of a signal terminal pair 52 in the connector width direction, and are located at the same positions as the first ground connecting portions 54C of the first counterpart ground plate 54 (see also FIG. 5). The second ground connecting portions 55C are soldered to the ground circuit unit of the circuit board.

Figure 5:
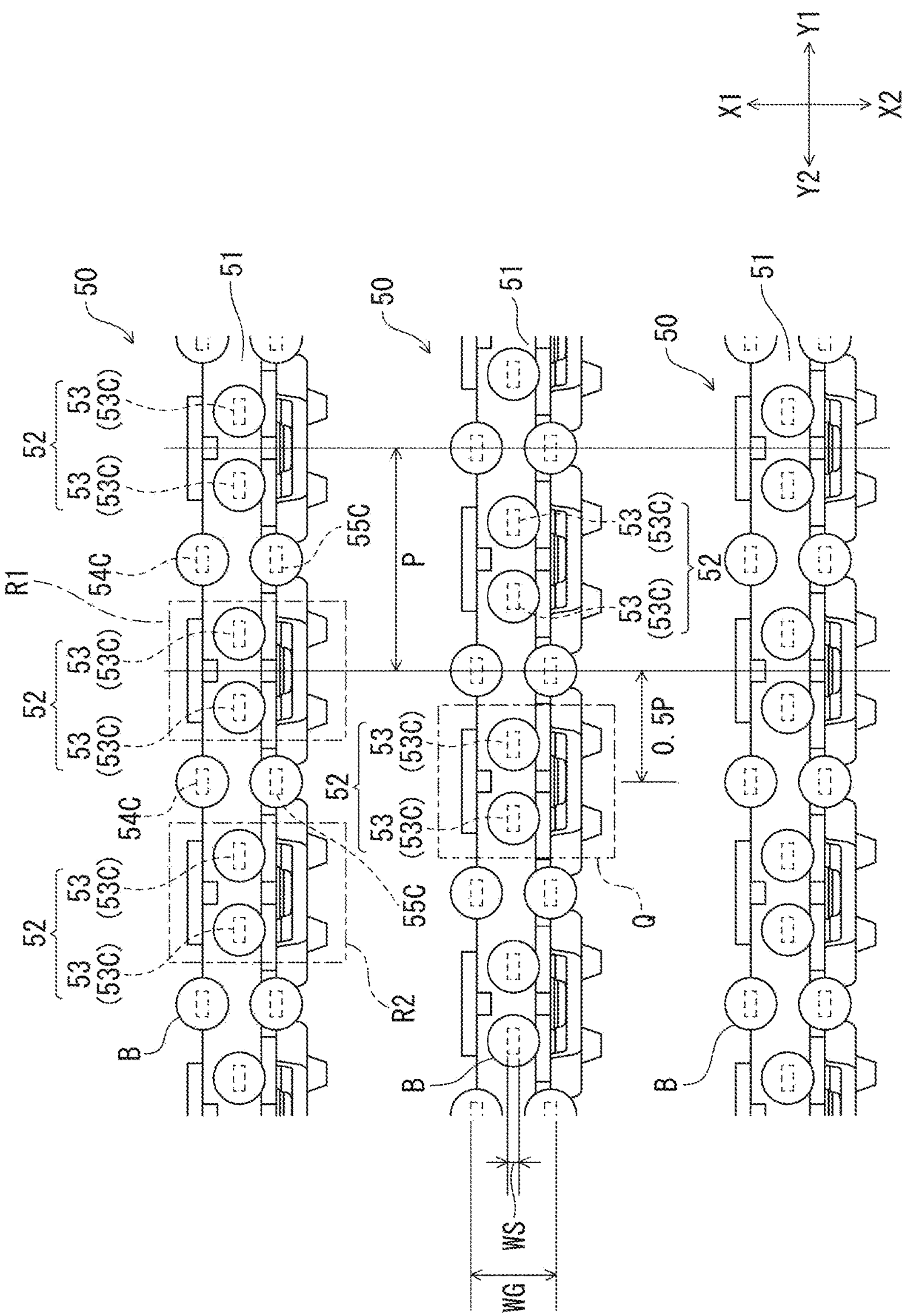
FIG. 5 is a bottom detail view of some of the terminal holders in the counterpart connector in FIG. 1.

In the terminal holders 50 provided to the counterpart connector 3, terminal holders 50 that are adjacent in the connector length direction (X axis direction) are positioned so as to be offset from each other in the connector width direction (Y axis direction). FIG. 5 shows a detail view of the intermediate portions of three terminal holders 50 in the connector width direction (Y axis direction). In FIG. 5, the signal connecting portions 53C, the first ground connecting portions 54C, and the second ground connecting portions 55C, to which solder balls B are attached, are indicated by broken lines. In this embodiment, as seen in FIG. 5, adjacent signal terminal pairs 52 are disposed in each terminal holder 50 at a distance of pitch P. Here, the pitch P is the distance between the center position of counterpart straight terminals

53 in one signal terminal pair 52 and the center position of the counterpart straight terminals 53 in the signal terminal pair 52 adjacent thereto.

Also, as seen in FIG. 5, the ground connecting portions 54C, 55C of the counterpart ground plates 54, 55 are disposed at positions such that the distance between the center position of the ground connecting portions 54C, 55C, and the center position of the signal terminal pairs 52 adjacent to the ground connecting portions 54C, 55C is 0.5 P (half pitch), which is one half the pitch P for one unit. In other words, the counterpart straight terminals 53 and the ground connecting portions 54C, 55C are arranged spaced apart at 0.5 P (half pitch), that is, at equal intervals. As for the terminal holders 50, the arrangement of the signal terminal pairs 52 in each terminal holder 50 is referred to as a "signal transmission path row", just as with the blades 20 of the relay connector 1 described above.

As seen in FIG. 5, in each terminal holder 50, one first ground connecting portion 54C and one second ground connecting portion 55C are located in the connector length direction, or in other words, side by side in the width direction (X axis direction) of the terminal holder 50, between two signal terminal pairs 52 in the connector width direction (Y axis direction). Also, the first ground connecting portions 54C and the second ground connecting portions 55C are located so as to be in line symmetry with respect to a straight line (a virtual line extending in the Y axis direction) in which the signal terminal pairs 52 are arranged. Therefore, as seen in FIG. 5, in the width direction (X axis direction), the width range WG between the positions at both ends of the ground connecting portions 54C, 55C goes beyond the width range WS of the signal connecting portions 53C.

As described above, in this embodiment, since the width range WG of the ground connecting portions 54C, 55C extends beyond the width range WS of the signal connecting portions 53C, the width range of the ground connecting portions is larger than the width range of the signal connecting portions compared with a conventional case where the signal terminals and the ground terminals have the same shape and only one ground connecting portion of a ground terminal is located between the signal connecting portions of adjacent signal terminals. As a result, it is possible to reduce crosstalk that concentrates around the ground connecting portions between adjacent signal connecting portions that sandwich the ground connecting portions.

Also, in this embodiment, the plurality of signal terminal pairs 52 in each signal transmission path row of the counterpart connector 3 consist of two types of signal terminal pairs 22, 24 alternately arranged by the relay connector 1, that is, are connected to the straight pairs 22 and the cross pairs 24, thereby reducing far-end crosstalk (FEXT).

As can be seen in FIG. 5, in this embodiment, for any two signal transmission path rows adjacent to each other in the connector length direction (X axis direction), the signal terminal pairs 52 of one signal transmission path row are disposed at the center position between the signal terminal pairs 52 of the other signal transmission path row in the connector width direction (Y axis direction). That is, the signal terminal pairs 52 of one signal transmission path row are offset from the signal terminal pairs 52 of the other signal transmission path row by 0.5 P (half pitch).

For example, in the three signal transmission path rows (upper, middle, and lower) shown in FIG. 5, if we let the "one signal transmission path row" be the middle signal transmission path row, and let the "other signal transmission path row" be the upper signal transmission path row, the signal terminal pairs 52 of the middle signal transmission path row are offset from the signal terminal pairs 52 in the upper signal transmission path row by 0.5 P (half pitch) toward the Y2 side in the connector width direction.

As shown in FIG. 5, if we focus on one specific signal terminal pair 52 that is arbitrarily specified in the middle signal transmission path row (referred to here as the "specific pair Q"), there are two signal terminal pairs 52 that are near the specific pair Q in the upper signal transmission path row. Here, these two signal terminal pairs 52 are referred to as the "first nearby pair R1" and the "second nearby pair R2". In FIG. 5, the specific pair Q, the first nearby pair R1, and the second nearby pair R2 are each shown surrounded by a one-dot chain line.

As can be seen in FIG. 5, the first nearby pair R1 and the second nearby pair R2 are located adjacent to each other in the same signal transmission path row (upper signal transmission path row), the first nearby pair R1 is offset by 0.5 P (half pitch) toward the Y1 side in the connector width direction (Y axis direction) with respect to the specific pair Q, and the second nearby pair R2 is offset by 0.5 P (half pitch) toward the Y2 side in the connector width direction with respect to the specific pair Q. That is, the specific pair Q is located in the center between the first nearby pair R1 and the second nearby pair R2 in the connector width direction. Therefore, the distance between the specific pair Q and the first nearby pair R1 is equal to the distance between the specific pair Q and the second nearby pair R2.

The specific pair Q is connected to one kind of pair, either the straight pair 22 or the cross pair 24, of the relay connector 1. Also, when the first nearby pair R1 is connected to a pair of the same type as the pair to which the specific pair Q is connected, the second nearby pair R2 will be connected to a pair of a different type from that of the pair to which the specific pair Q is connected. Therefore, in the specific pair Q, the polarities are reversed with each other relative to the second nearby pair R2, and the polarities are not reversed with each other relative to the first nearby pair R1. As a result, in this embodiment, when the signal transmission directions between the specific pair Q and the first nearby pair R1 and between the specific pair Q and the second nearby pair R2 are opposite to each other, the peaks of the waveforms of near-end crosstalk (NEXT) signals from the first nearby pair R1 and those of NEXT signals from the second nearby pair R2 will reach the specific pair Q in a state of being offset. Therefore, this avoids the overlapping of the peaks of the waveforms of the NEXT signals from the first nearby pair R1 and the second nearby pair R2, and near-end crosstalk (NEXT) in the specific pair Q is accordingly reduced.

Also, in this embodiment, the specific pair Q is located in the center between the first nearby pair R1 and the second nearby pair R2 in the connector width direction, and since the distance between the specific pair Q and the first nearby pair R1 is equal to the distance between the specific pair Q and the second nearby pair R2, the peaks of the waveforms of the NEXT signals from the first nearby pair R1 and the second nearby pair R2 can be maximally offset with respect to the specific pair Q, and NEXT can be better reduced in the specific pair Q.

Figure 6:
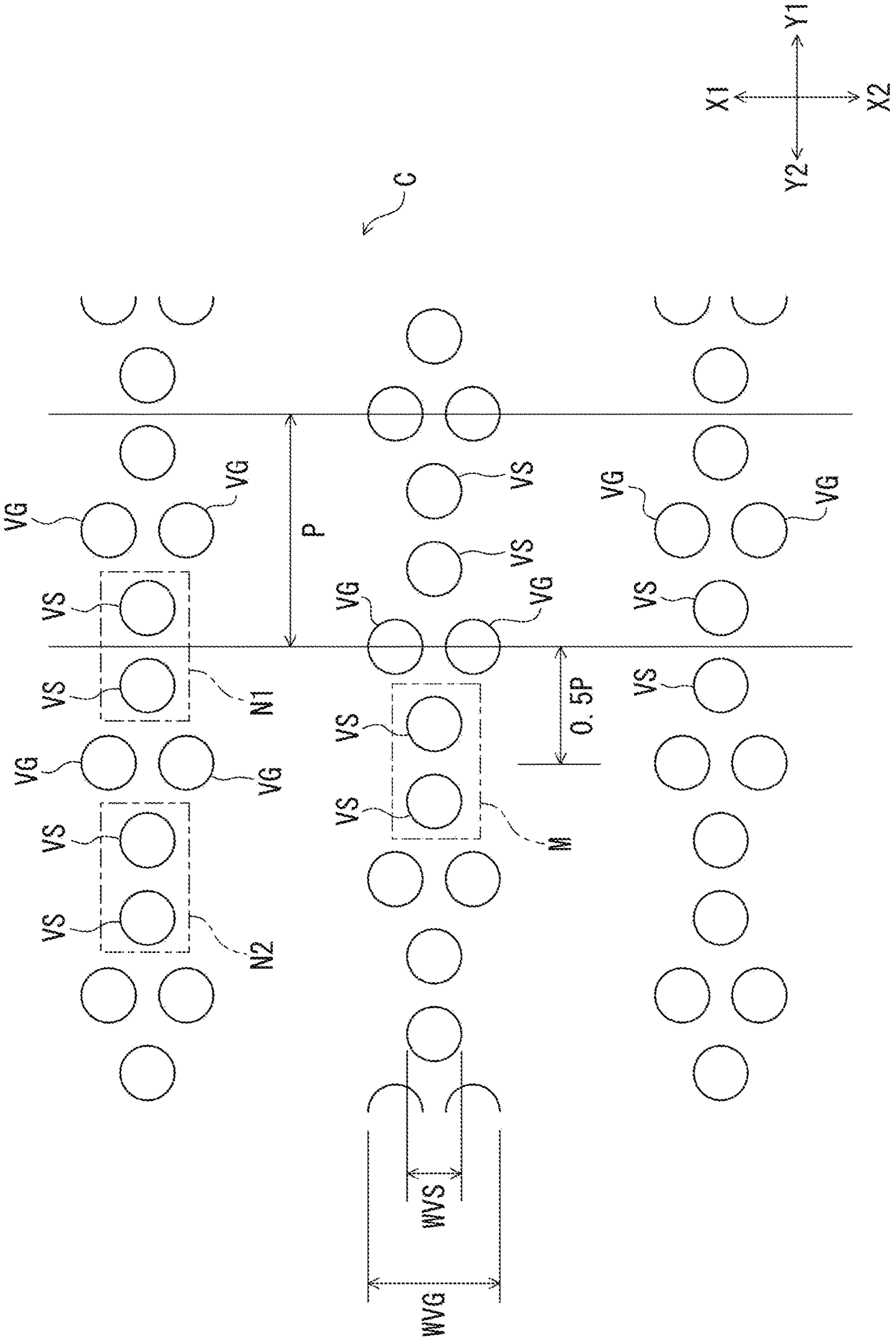
FIG. 6 is a bottom view showing only some of the vias in a circuit board on which the counterpart connector is mounted.

FIG. 6 is a bottom view of some of the vias in the circuit board C on which the counterpart connector 3 is mounted. The circuit board C has a signal circuit unit to which the counterpart straight terminals 53 of the counterpart connector 3 are connected, and a ground circuit unit to which the counterpart ground plates 54, 55 are connected. The signal circuit unit has a plurality of signal lands (not shown)

serving as mounting surfaces to which the signal connecting portions 53C of the counterpart straight terminals 53 are soldered on the mounting surface of the circuit board C, and a plurality of signal vias VS that are located within the thickness of the circuit board C corresponding to the signal lands and are electrically connected to the signal lands. The ground circuit unit has a plurality of ground lands (not shown) serving as mounting surfaces to which the ground connecting portions 54C, 55C of the counterpart ground plates 54, 55 are soldered on the mounting surface of the circuit board C, and a plurality of ground vias VG that are located within the thickness of the circuit board C corresponding to the ground lands and are electrically connected to these ground lands.

The signal lands and the ground lands each have a circular shape on the mounting surface of the circuit board C, and are arranged on the mounting surface of the circuit board C in a positional relationship corresponding to the connecting portions 53C, 54C, and 55C. The signal vias VS and the ground vias VG (hereinafter, collectively referred to as the "vias VS and VG" when it is not necessary to distinguish between the two) are located in the center of the corresponding signal lands and ground lands, respectively, when viewed in the vertical direction, and have a cylindrical shape extending in the vertical direction through the plate thickness of the circuit board.

As seen in FIG. 6, the vias VS and VG are located such that ground vias VG corresponding respectively to one ground connecting portion 54C and one second ground connecting portion 55C are side by side in the connector width direction (Y axis direction), or in other words, in the width direction (X axis direction) of the terminal holder 50, in between two signal vias VS corresponding to two pairs of signal connecting portions 53C in the connector length direction (X axis direction).

In this embodiment, as seen in FIG. 6, adjacent signal vias VS, as well as signal vias VS and ground vias VG that are adjacent to each other, are disposed at a distance of pitch P in the connector width direction (Y axis direction). Hereinafter, the arrangement of signal vias VS in the connector width direction corresponding to one terminal holder 50 shall be referred to as a "via row". Also, in each via row, a pair of signal vias corresponding to a signal terminal pair 52 shall be referred to as a "via pair".

The two ground vias VG that are side by side in the width direction are located in line symmetry with respect to the straight line (virtual line extending in the Y axis direction) in which signal vias VS are arranged. That is, in the width direction (X axis direction), the width range WVG between the positions at both ends of the two ground vias VG extends beyond the width range WVS of the signal connecting portions.

As described above, in this embodiment, since the width range WVG of the ground vias VG extends beyond the width range WVS of the signal vias VS, the width range of the ground vias is larger than the width range of the signal vias as compared with a conventional case where the signal vias and the ground vias both have the same shape and only one ground via is located between adjacent signal vias. As a result, it is possible to reduce crosstalk that concentrates around the ground vias between adjacent signal vias that sandwich the ground vias.

Also, in this embodiment, since the plurality of via pairs VS in each via row correspond to the two types of signal terminal pairs 22, 24 alternately arranged in the relay connector 1, that is, to the straight pairs 22 and the cross pairs 24, far-end crosstalk (FEXT) is reduced.

As can be seen in FIG. 5, in this embodiment, for any two via rows adjacent to each other in the connector length direction (X axis direction), the via pairs in one via row are disposed in the center position between the via pairs of the other via row in the connector width direction (Y axis direction). That is, the via pairs of one via row are offset by 0.5 P (half pitch) from the via pairs of the other via row.

For example, in the three via rows (upper, middle, and lower) shown in FIG. 6, if we let the "one via row" be the middle via row, and let "the other via row" be the upper via row, then the via pairs in the middle via row are offset by 0.5 P (half pitch) toward the Y2 side in the connector width direction with respect to the via pairs in the upper via row.

As shown in FIG. 6, if we focus on one via pair that is arbitrarily specified in the middle via row (here, referred to as the "specific pair M"), there are two via pairs near the specific pair M in the upper via row. Here, these two via pairs shall be referred to as the "first nearby pair N1" and "second nearby pair N2". In FIG. 5, the specific pair M, the first nearby pair N1, and the second nearby pair N2 are each shown surrounded by a one-dot chain line.

In the via pairs of the circuit board C, as was described for the relay connector 1 and the counterpart connector 3 with reference to FIGS. 3 and 5, the specific pair M, as seen in FIG. 6, is located in the center between the first nearby pair N1 and the second nearby pair N2 in the connector width direction, and the distance between the specific pair M and the first nearby pair N1 is equal to the distance between the specific pair M and the second nearby pair N2.

Also, in the specific pair M, when either the first nearby pair N1 or the second nearby pair N2 (for example, the first nearby pair N1) has its polarity reversed, the other (for example, the second nearby pair N2) will not have its polarity reversed. As a result, this avoids the overlapping of the peaks of the waveforms of NEXT signals from both the first nearby pair R1 and the second nearby pair R2 with respect to the specific pair M, and near-end crosstalk (NEXT) in the specific pair M is accordingly reduced, just as was described above for the relay connector 1 and the counterpart connector 3.

Also, in this embodiment, since the specific pair M is located in the center between the first nearby pair N1 and the second nearby pair N2 in the connector width direction, and the distance between the specific pair M and the first nearby pair N1 is equal to the distance between the specific pair M and the second nearby pair N2, the peaks of the waveforms of the NEXT signals can be maximally offset from the first nearby pair N1 and the second nearby pair N2 with respect to the specific pair M, and NEXT can be better reduced in the specific pair Q.

The connector mating operation between the relay connector 1 and the counterpart connectors 2, 3 will now be described. First, the counterpart connectors 2, 3 are soldered to different circuit boards (not shown). Next, as seen in FIG. 1, the counterpart connector 3 is oriented so that the signal contact portions 53B-1 and the ground contact portions 54B-1 and 55B-1 are located on the upper side, and the relay connector 1 is located above the counterpart connector 3.

Next, the relay connector 1 is moved downward (see the arrow in FIG. 1), and the blades 20 are inserted into and connected to the terminal holder 50 of the corresponding counterpart connector 3 from above. When the mating of the relay connector 1 and the counterpart connector 3 is complete, the signal connecting portions 23A, 25A of the signal terminal pairs 22, 24 provided to the blades 20, and the ground connecting portion 26A of the ground terminal 26 come into contact, under pressure, with the signal contact portions 53B-1 of the signal terminal pairs 52 provided to the counterpart connector 3 and the first ground contact portions 54B-1 of the first counterpart ground plate 54 to electrically connect the components. Also, the second ground plates 28 of the blades 20 come into contact, under pressure, with the second ground contact portions 55B-1 of the second counterpart ground plate 55 of the counterpart connector 3 to electrically connect the components. At this point, the signal contact portions 53B-1 and the ground contact portions 54B-1, 55B-1 of the counterpart connector 3 receive the pressing force from the blades 20 and are elastically displaced in the plate thickness direction (X axis direction).

Next, the counterpart connector 2 is matingly connected to the relay connector 1 from above in an upside-down orientation (the orientation shown in FIG. 1) with respect to the counterpart connector 3 (see the arrow in FIG. 1). The procedure for matingly connecting the counterpart connector 2 is the same as that described above for the counterpart connector 3.

When the counterpart connector 2 and the counterpart connector 3 are matingly connected to the relay connector 1 in this way, the counterpart connector 2 and the counterpart connector 3 are electrically connected via the relay connector 1.

In the relay connector 1 of this embodiment described above, a plurality of blades 20 were arranged in the connector length direction (X axis direction), and the signal transmission paths provided to the blades 20 were a plurality of terminals, namely, the straight terminals 23 and the cross terminals 25, arranged in the connector width direction. However, the signal transmission paths in the present invention do not have to be terminals, and may, for example, be a conductive pattern formed on a relay circuit board as shown in FIGS. 7(A) and (B) (modification examples).

Figure 7B:
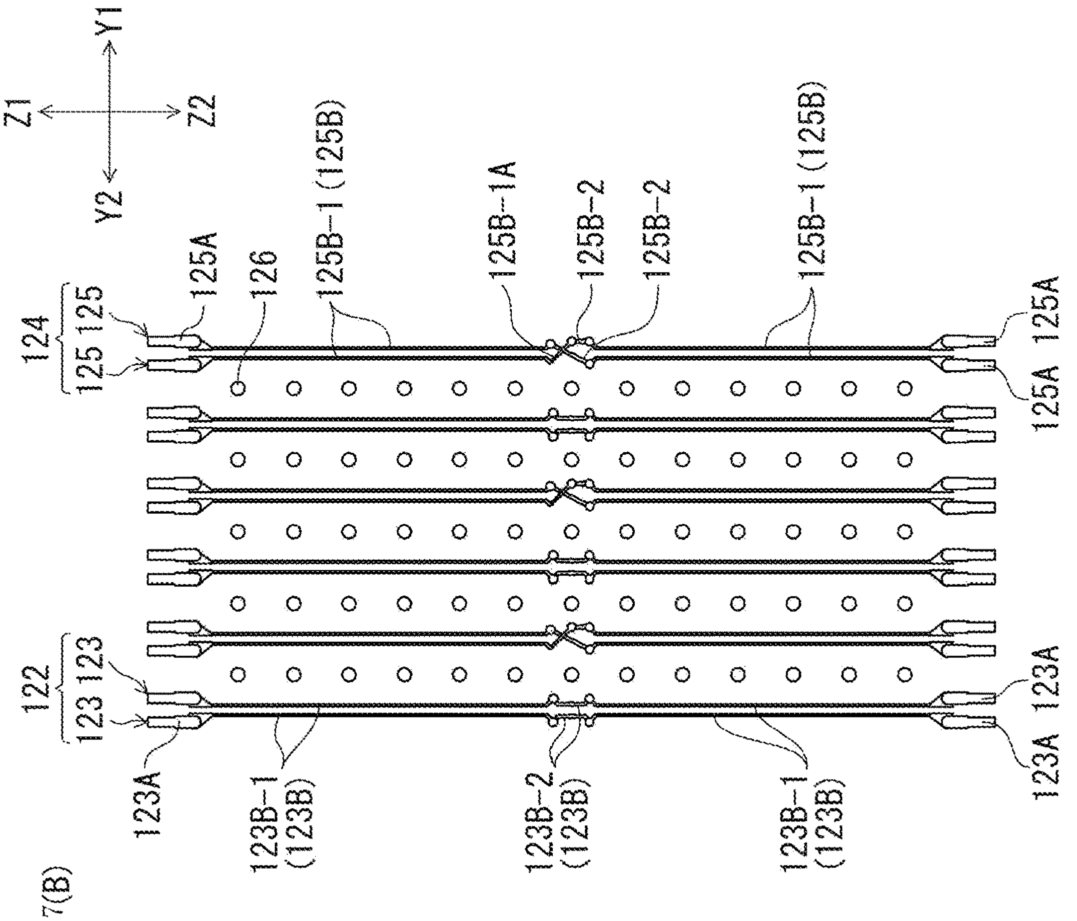
FIG. 7(B) is a front view of the conductive pattern and ground vias of the relay circuit board in FIG. 7(A).
Figure 7A:
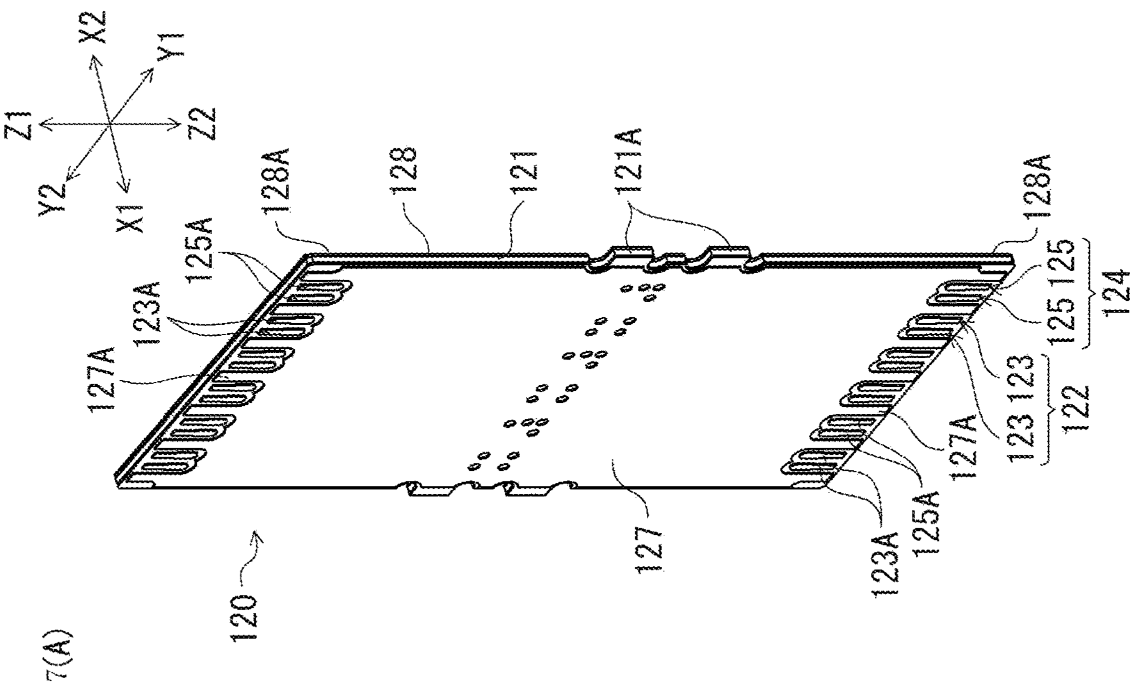
FIG. 7(A) is an oblique view of a relay circuit board of a relay electrical connector in a modified example as a single unit.

FIG. 7(A) is an oblique view of the relay circuit board of the relay connector in a modification example, shown as a single unit, and FIG. 7(B) is a front view of the conductive pattern and ground vias of the relay circuit board in FIG. 7(A). With the relay connector (not shown) in this modification example, a plurality of the relay circuit boards 120 shown in FIG. 7(A) are accommodated in a housing (not shown) in a state of being arranged in the connector length direction (X axis direction).

The relay circuit board 120 has a base material 121 made of an electrically insulating material such as resin; conductive patterns (conductive pattern pairs 122, 124; discussed below) that form transmission path pairs serving as signal transmission paths formed on the base material 121; a plurality of ground vias 126 located between the conductive pattern pairs 122, 124; and ground layers 127, 128 (first ground layer 127 and second ground layer 128, discussed below) formed so as to cover both plate surfaces of the base material 121 (surfaces perpendicular to the plate thickness direction (Z-axis direction)).

As seen in FIG. 7(A), two supported protrusions 121A are formed on the base material 121 so as to project at positions near the center of both end edges extending in the vertical direction, and the base material is supported in the housing by these supported protrusions 121A. Also, a plurality of slender conductive patterns extending in the vertical direction are arranged on the base material 121 in the connector width direction (Y axis direction) (see FIG. 7(B)). The plurality of conductive patterns have the conductive pattern pairs 122, 124 as transmission path pairs. The conductive pattern pairs 122, 124 have two types of pairs, straight pairs 122 and cross pairs 124. In this embodiment as seen in FIG. 7(B), the straight pairs 122 and the cross pairs 124 are alternately arranged in the connector width direction (Y axis direction).

The straight pairs 122 have a pair of straight patterns 123 extending over the entire range from one end side to the other end side spaced apart in the vertical direction. When viewed in the plate thickness direction of the base material 121 (the X axis direction perpendicular to the viewing plane in FIG. 7(B)), the pairs of straight patterns 123 are in left-right symmetry and vertical symmetry with each other. The straight patterns 123 each have a signal connecting portion 123A for connecting to a counterpart connector (not shown), a plurality of rib portions 123B that are divided and extending in the vertical direction, and a plurality of signal vias (not shown) extending in the plate thickness direction (X axis direction) through the plate thickness of the base material 121.

As shown in FIG. 7(B), the signal connecting portions 123A are located at both ends of the straight patterns 123 in the vertical direction, and as shown in FIG. 7(A), are exposed from the plate surface on the X1 side of the base material 21. In this embodiment, the rib portions 123B are formed over two layers within the plate thickness of the base material 121. More specifically, as seen in FIG. 7(B), the rib portions 123B are divided into three portions in the vertical direction, and have long rib portions 123B-1 located in the upper and lower ranges, and short rib portions 123B-2 located in the middle range.

In this embodiment, two long rib portions 123B-1 are formed as layers located on the X1 side (the front side in FIG. 7(B)) in the plate thickness direction of the base material 121 (in the X axis direction perpendicular to the viewing plane in FIG. 7(B)), and the short rib portions 123B-2 are formed as layers located on the X2 side (the back side in FIG. 7(B)).

Signal vias (not shown) extend in a cylindrical shape in the plate thickness direction (X axis direction) of the base material 121 positioned at both ends in the vertical direction in each of the above-mentioned three portions of the rib portions 123B. The signal vias are electrically connected to each other by linking the above three portions of the rib portions 123B, and linking the upper and lower end portions of the rib portions 123B and the signal connecting portions 123A. As a result, one signal transmission path is formed by one straight pattern 123 composed of a signal connecting portion 123A, a rib portion 123B, and a signal via.

In this embodiment, as discussed above, because signal vias extending over two layers are included in the straight pattern 123, the signal transmission paths in the straight patterns 123 are adjusted to substantially the same length as the signal transmission paths in the cross pattern 125 (discussed below) of the cross pairs 124.

The cross pairs 124 each have a pair of cross patterns 125. The pair of cross patterns 125 are bent in the plate thickness direction so as to be separated from each other in the plate thickness direction (X axis direction) of the base material 121 at an intermediate position in the vertical direction, and intersect without coming into contact with each other, as shown in FIG. 7(B). The pair of cross patterns 125 have a shape that is in left-right asymmetry and vertical asymmetry with each other when viewed in the plate thickness direction of the base material 121 (the X axis direction perpendicular to the viewing plane in FIG. 7(B)). Just as with the straight patterns 123, the cross patterns 125 also have signal connecting portions 125A for connecting to a counterpart connector (not shown), a plurality of rib portions 125B divided and extending in the vertical direction, and a plurality of signal vias (not shown) extending in the plate thickness direction (X axis direction) through the plate thickness of the base material 121.

Since the cross patterns 125 have the same configuration as the straight patterns 123 described above, except for the rib portions 125B, a numeral 2 will be added to the numbering of the corresponding portions in the straight patterns 123 for the parts that are the same, and description of these will be omitted. The rib portions 125B of the cross patterns 125 each have two long rib portions 123B-1 and one short rib portion 123B-2, which are linked by signal vias.

As can be seen in FIG. 7(B), of the long rib portions 125B-1 in a pair of cross patterns 125 constituting a cross pair 124, that is, of a total of four rib portions 125B-1, one long rib portion 125B-1 extending from the Y2 side to the upper side (Z1 side) is formed slightly longer than the other three long rib portions 125B-1. More specifically, an inclined portion 125B-1A whose lower end portion extends so as to incline toward the Y1 side is formed on the one long rib portion 125B-1, and the one long rib portion 125B-1 is longer than the other long rib portions 125B-1 by an amount corresponding to this inclined portion 125B-1A.

All the long rib portions 125B-1 of a pair of cross patterns 125 are formed in a layer located on the X1 side (the front side in FIG. 7(B)) in the plate thickness direction of the base material 121 (the X axis direction perpendicular to the viewing plane in FIG. 7(B)). Meanwhile, the short rib portion 125B-2 is formed in a layer located on the X2 side (the back side in FIG. 7(B)).

In this embodiment, as seen in FIG. 7(B), one short rib portion 125B-2 linked to the above-mentioned inclined portion 125B-1A extends in the vertical direction without being inclined, and is formed shorter than the other short rib portion 125B-2 (discussed below). Meanwhile, the other short rib portion 125B-2 extends so as to incline downward toward the Y2 side when viewed in the plate thickness direction (X axis direction) of the base material 121, and intersects the inclined portion 125B-1A. This other short rib portion 125 B-2 is formed slightly longer than the inclined portion 125 B-1A.

In the pair of cross patterns 125, the inclined portion 125B-1A of the long rib portion 125B-1 and the other short rib portion 125B-2 are prevented from coming into contact with each other by intersecting in this way. Also, forming the one short rib portion 125B-2 in a layer located on the X2 side (the back side in FIG. 7(B)) increases the number of signal vias, and as a result, the lengths of the signal transmission paths of the two cross patterns 125 constituting a cross pair 124 are substantially the same.

As seen in FIG. 7(B), a plurality of ground vias 126 are arranged in the vertical direction between the straight pairs 122 and the cross pairs 124 in the connector width direction (Y axis direction). The ground vias 126 have a cylindrical shape extending in the plate thickness direction (X axis direction) through the plate thickness of the base material 121, and link the first ground layer 127 and the second ground layer 128 (discussed below). The larger the number of ground vias 126 arranged in the vertical direction, the better the effect of reducing crosstalk between adjacent straight pairs 122 and cross pairs 124.

The ground layers 127, 128 are in the form of metal layers, and are formed so that the first ground layer 127 covers the plate surface on the X1 side of the base material 121, and the second ground layer 128 covers the plate surface on the X2 side of the base material 121. The ground layers 127, 128 are formed over a range extending from the upper end to the lower end of the base material 121, but in the ground layer 127, as seen in FIG. 7(A), portions corresponding to the signal connecting portions 123A, 125A of the conductive pattern pairs 122, 124 are cut out in the connector width direction at the upper end portion and the lower end portion, which exposes the signal connecting portions 123A, 125A. The uncut portions at the upper end and the lower end portions of the first ground layer 127 constitute ground connecting portions 127A for connecting to a ground member (not shown) of a counterpart connector. Meanwhile, the upper end portion and the lower end portion of the second ground layer 128 are not cut out anywhere, and constitute ground connecting portions 128A for connecting to a ground member (not shown) of a counterpart connector.

In the modification example shown in FIG. 7, a plurality of relay circuit boards 120 having this configuration are arranged in the connector length direction, and adjacent relay circuit boards are offset by one-half pitch in the connector width direction to reduce near-end crosstalk (NEXT), just as with the blades 20 in the embodiment described above with reference to FIGS. 1 to 6.

In this embodiment and this modified example, an example was given in which the present invention was applied to a so-called three-piece connector in which two electrical connectors (counterpart connectors) are electrically connected to each other via one relay electrical connector (relay connector), but the number of electrical connectors that are connected is not limited to three. For instance, the present invention can also be applied to a so-called two-piece connector consisting of only two connectors that are matingly connected to each other. When the present invention is applied to a two-piece connector, one of the connectors is called the first connector and the other is called the second connector.

In this embodiment, in the relay connector 1, the straight terminals 23, the cross terminals 25, the ground terminals 26, and the ground plates 27, 28 are configured as a part of the blades 20 held in the housing 10. Also, in the counterpart connectors 2, 3, the counterpart straight terminals 53 and the counterpart ground plates 54, 55 are configured as a part of the terminal holder 50 held in the housing 40. Also, in the modification example shown in FIGS. 7(A) and (B), the straight patterns 123, the cross patterns 125, the ground vias 126, and the ground layers 127, 128 are constituted as a part of the relay circuit board 120 held in the housing. That is, in this embodiment and the modification example, the signal transmission paths and the ground members are held indirectly in the housing in the relay connector and the counterpart connectors, but the signal transmission paths and the ground members may instead be held in the housing directly.

Although in the present embodiment the ground connecting portions 54C, 55C of the two counterpart ground plates 54, 55 are located at the same positions in the connector width direction (Y-axis direction), it is not essential for them to be located at the same positions. For example, the ground connecting portions of the two ground plates may be offset with respect to one another in the connector width direction (Y-axis direction) and, as a whole, may be positioned in a staggered configuration.

In addition, although in the present embodiment the ground connecting portions 54C, 55C of the counterpart ground plates 54, 55 extend downwardly in a rectilinear configuration parallel to the vertical direction (Z-axis direction), the shape of the ground connecting portions 54C, 55C is not limited thereto. For example, the ground connecting portions may have a rectilinear configuration oblique to the vertical direction and, in addition, the ground connecting portions may have a curved shape at an intermediate location thereof. At such time, for example, the ground connecting portions of the two ground plates may positioned extending away from one another. In addition, the ground connecting portions of the two ground plates may extend in a converging manner, thereby causing the ground connecting portions of one ground plate to be positioned extending towards the other ground plate.

Although in the present embodiment the counterpart connectors 2, 3 are provided with counterpart ground plates 54, 55 serving as ground members, as a variation, there may also be provided ground terminals serving as ground members. For example, as a result of placing ground terminals between the signal terminal pairs in the connector width direction (Y-axis direction), the ground connecting portions of the ground plates and the ground connecting portions of the ground terminals will be positioned side by side in the connector length direction (X-axis direction) perpendicular to the connector width direction, and the width range (range corresponding to WG in FIG. 5) will be formed by these ground connecting portions. In this variation, the ability to reduce the crosstalk that concentrates around the ground connecting portions increases with the number of the ground connecting portions of the ground terminals.

In yet another variation, the crosstalk-reducing effect is enhanced by providing multiple ground connecting portions located side by side in the connector length direction in one ground terminal and providing multiple ground terminals in the connector length direction. Furthermore, in this additional variation, providing ground plates is not essential.

In the present embodiment each counterpart connector 2, 3 is provided with two counterpart ground plates serving as ground members, i.e., the first counterpart ground plate 54 and the second counterpart ground plate 55, however, as an alternative, one counterpart ground plate may be provided. In such a case, the sections soldered to the mounting surface portions of the circuit board in the ground connecting portions of the counterpart ground plate are formed extending along said mounting surface and the width range of the sections (range in the X-axis direction) may extend beyond the width range of the connecting portions of the signal transmission paths.

While the present embodiment has described an example wherein the present invention is applied to an electrical connector in which signal transmission paths are transmission path pairs and high-speed differential signals are transmitted transmission path pairs, in the present invention, it is not essential for the signal transmission paths to be transmission path pairs and single-ended transmission paths may also be used. For example, the signal transmission paths, as single-ended transmission paths, may be single-ended terminals or single-ended electrically conductive patterns.

Although in the present embodiment the mounting surface portions of the circuit board are lands connected to vias, the embodiments of the mounting surface portions are not limited thereto and, for example, these may be pads connected to so-called patterns disposed on the mounting surface of the circuit board.

Although the present embodiment has described an example in which the terminals of each connector 1, 2, 3 and the circuit units of the circuit board are located in adjacent rows with an offset in the connector width direction, the present invention is applicable to connectors and circuit boards in which terminals and circuit units are provided in adjacent rows at the same locations without an offset in the connector width direction.

DESCRIPTION OF THE REFERENCE NUMERALS

1 Relay connector
2 Counterpart connector
3 Counterpart connector
10 Housing
22, 122 Straight pairs
23, 123 Straight terminals
24, 124 Cross pairs
25, 125 Cross terminals
23A, 123A Signal connecting portions
25A, 124A Signal connecting portions
52 Signal terminal pair (signal transmission path)
53 Counterpart straight terminal (signal transmission path)
53C Signal connecting portion
54 First counterpart ground plate (ground member)
54C First ground connecting portion
55 Second counterpart ground plate (ground member)
55C Second ground connecting portion
C Circuit board
VS Signal via
VG Ground via

The invention claimed is:

1. An electrical connector comprising:

a plurality of signal transmission paths soldered to signal circuit units on a circuit board at a plurality of locations spaced apart in an arrangement direction, said arrangement direction being a direction parallel to a mounting surface of the circuit board, and at least one ground member soldered to ground circuit units on the circuit board, the signal transmission paths having signal connecting portions soldered to the signal circuit units, the ground members having ground connecting portions, which are soldered to the ground circuit units and are part of ground plates serving as the ground members, and said ground connecting portions being positioned in the arrangement direction between the signal connecting portions of the adjacent signal transmission paths, wherein two ground connecting portions are disposed parallel to the mounting surface, perpendicular to the arrangement direction, and extend beyond a width range of the signal connecting portions of the signal transmission paths.

2. The electrical connector according to claim 1 wherein the signal transmission paths are single-ended terminals.

3. The electrical connector according to claim 1 wherein the signal transmission paths are terminal pairs that are adjacent and spaced apart in the arrangement direction.

4. The electrical connector according to claim 1, wherein the ground connecting portions are part of the ground terminals serving as the ground members.

5. The electrical connector according to claim 1, wherein a plurality of the ground connecting portions are arranged side by side in the width direction between the signal connecting portions.

6. The electrical connector of claim 1, wherein a circuit board has provided thereon signal circuit units to which the signal connecting portions of the signal transmission paths in said electrical connector are soldered and ground circuit units to which the ground connecting portions of the ground members are soldered, wherein the electrical connector is mounted to the circuit board.

7. The electrical connector according to claim 6, wherein a plurality of the ground connecting portions are arranged side by side in the width direction between the signal connecting portions, the ground circuit units of the circuit board have a plurality of mounting surface portions located on the mounting surface of the circuit board in alignment with the plurality of the ground connecting portions, and the plurality of the ground connecting portions are soldered to the mounting surface portions.

* * * * *